(12) United States Patent
Vilermo et al.

(10) Patent No.: US 11,184,520 B1
(45) Date of Patent: Nov. 23, 2021

(54) METHOD, APPARATUS AND COMPUTER PROGRAM PRODUCT FOR GENERATING AUDIO SIGNALS ACCORDING TO VISUAL CONTENT

(71) Applicant: Nokia Technologies Oy, Espoo (FI)

(72) Inventors: Miikka Tapani Vilermo, Siuro (FI); Arto Juhani Lehtiniemi, Lempaala (FI); Antti Johannes Eronen, Tampere (FI); Mikko Olavi Heikkinen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/878,828

(22) Filed: May 20, 2020

(51) Int. Cl.
*H04N 5/232* (2006.01)
*H04R 3/00* (2006.01)
*H04N 5/222* (2006.01)

(52) U.S. Cl.
CPC ..... *H04N 5/232121* (2018.08); *H04N 5/2226* (2013.01); *H04N 5/23218* (2018.08); *H04N 5/23222* (2013.01); *H04R 3/005* (2013.01)

(58) Field of Classification Search
CPC ......... H04N 5/232121; H04N 5/23222; H04N 5/23218; H04N 5/2226; H04R 3/005
See application file for complete search history.

(56) References Cited

U.S. PATENT DOCUMENTS

2014/0168471 A1* 6/2014 Lay ............... H04N 5/232945
348/231.99
2018/0158446 A1* 6/2018 Miyamoto ....... G10K 11/17885

OTHER PUBLICATIONS

Pertilä et al., "Passive Self-Localization of Microphones Using Ambient Sounds", Proceedings of the 20th European Signal Processing Conference (EUSIPCO), Aug. 27-31, 2012, pp. 1314-1318.

* cited by examiner

*Primary Examiner* — Ahmed A Berhan
(74) *Attorney, Agent, or Firm* — Alston & Bird LLP

(57) ABSTRACT

A method, apparatus and computer program product are provided for generating audio signals according to visual content. Bokeh refers to a blurring of areas in a photograph or video that are in front of or behind a visual focal plane. Microphones in different positions in the environment of the captured visual content may be mixed according to their positions relative to a visual focal plane of the visual content to generate audio signals. Audio signals may be generated further dependent on a visual effect applied to captured content.

18 Claims, 6 Drawing Sheets

METHOD, APPARATUS AND COMPUTER PROGRAM PRODUCT FOR GENERATING AUDIO SIGNALS ACCORDING TO VISUAL CONTENT

TECHNOLOGICAL FIELD

An example embodiment of the present disclosure relates to electronic audio signals, and more particularly, to a method, apparatus, and computer program product for generating audio signals according to visual data.

BACKGROUND

In photography, bokeh refers to a blurring of areas in a photograph or video that are in front of or behind a visual focal plane. Some systems provide these visual effects by using two or more cameras, or Time-of-Flight (ToF) cameras to create a depth map, and blurring the areas of an image or video that are not at the depth of the visual focal plane or object of focus. In some cases, the depth map can be estimated from a single camera image and used to create a visual bokeh effect. The bokeh refers to the visual effect applied to the visual content. Associated audio signals are often unaffected by applying a bokeh, or other change in focus, blurring, and/or other visual enhancements.

BRIEF SUMMARY

A method, apparatus, and computer program product are therefore provided for generating audio signals according to visual content.

An apparatus is provided, comprising at least one processor and at least one memory including computer program code, the at least one memory and the computer program code configured to, with the processor, cause the apparatus to at least receive an indication of visual content and a visual focal plane associated therewith, receive indications of at least two microphones and their respective positions relative to the visual focal plane, and dynamically generate an audio signal dependent on at least respective positions of first and second microphones of the at least two microphones relative to the visual focal plane.

According to certain example embodiments, the visual focal plane is (a) orthogonal to an optical axis of a camera from which the visual content was captured, and (b) at a distance from the camera where the lens is focused. In certain embodiments, the audio signal is dynamically generated further dependent on a level of bokeh in the visual content.

In certain example embodiments, at least the first microphone is positioned such that at least one of the following conditions is satisfied when the visual content is captured: (a) the first microphone is embedded in a device from which the visual content is captured, or (b) the first microphone is within a first threshold distance of the device from which the visual content is captured. In certain example embodiments, at least the second microphone is positioned within a second threshold distance of the visual focal plane when the visual content is captured.

In certain example embodiments, the audio signal is dynamically generated further dependent on respective positions of the first and second microphones relative to borders of the visual focal plane. In certain example embodiments at least the first microphone is positioned within a threshold distance of the visual focal plane when the visual content is captured. In certain example embodiments the audio signal is dynamically generated further dependent on respective positions of the first and second microphones relative to a position on the visual focal plane. In certain example embodiments, the position on the visual focal plane is the center of the visual focal plane. In certain embodiments, the audio signal is dynamically generated further dependent on a position of a detected object.

A method is provided including receiving an indication of visual content and a visual focal plane associated therewith, receiving indications of at least two microphones and their respective positions relative to the visual focal plane, and dynamically generating an audio signal dependent on at least respective positions of first and second microphones of the at least two microphones relative to the visual focal plane.

A computer program product is provided, comprising at least one non-transitory computer-readable storage medium having computer-executable program code instructions stored therein, the computer-executable program code instructions comprising program code instructions to receive an indication of visual content and a visual focal plane associated therewith, receive indications of at least two microphones and their respective positions relative to the visual focal plane, and dynamically generate an audio signal dependent on at least respective positions of first and second microphones of the at least two microphones relative to the visual focal plane.

An apparatus is provided with means for receiving an indication of visual content and a visual focal plane associated therewith, means for receiving indications of at least two microphones and their respective positions relative to the visual focal plane, and means for dynamically generating an audio signal dependent on at least respective positions of first and second microphones of the at least two microphones relative to the visual focal plane.

BRIEF DESCRIPTION OF THE DRAWINGS

Figure 1:
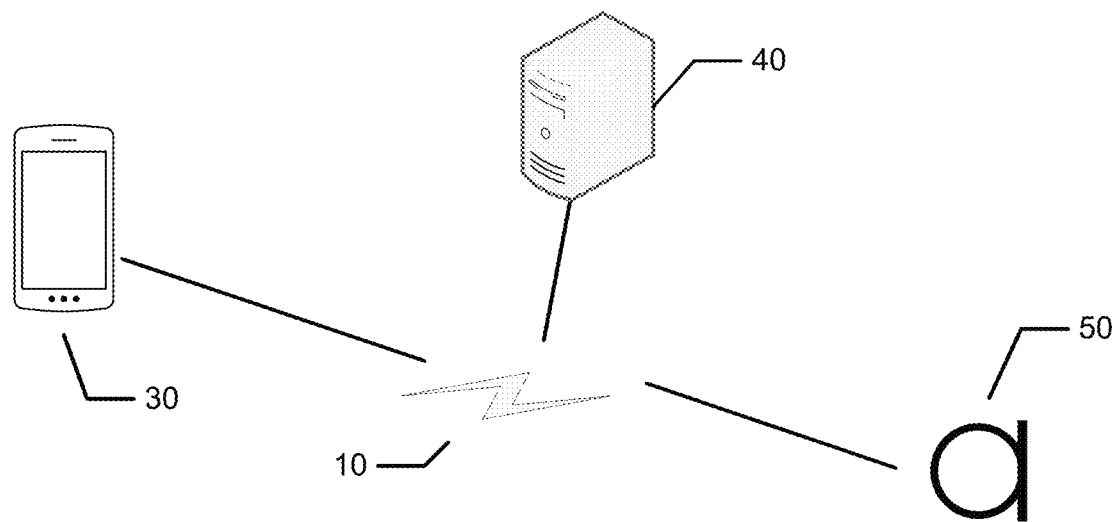
Figure 2:
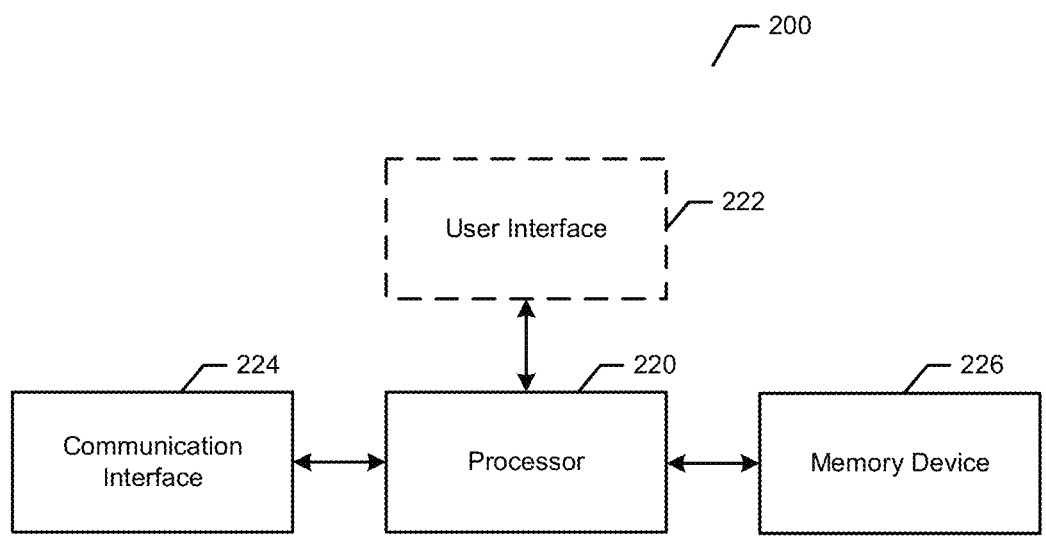
Figure 3:
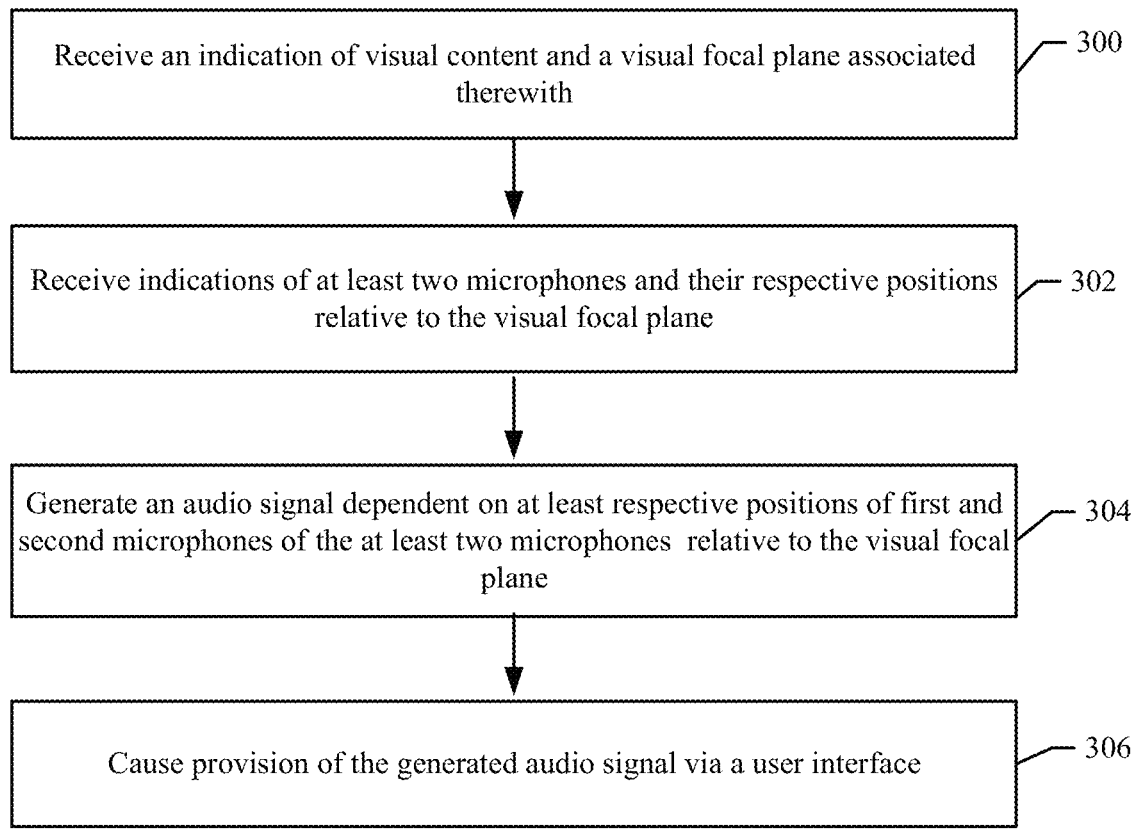
Figure 4A:
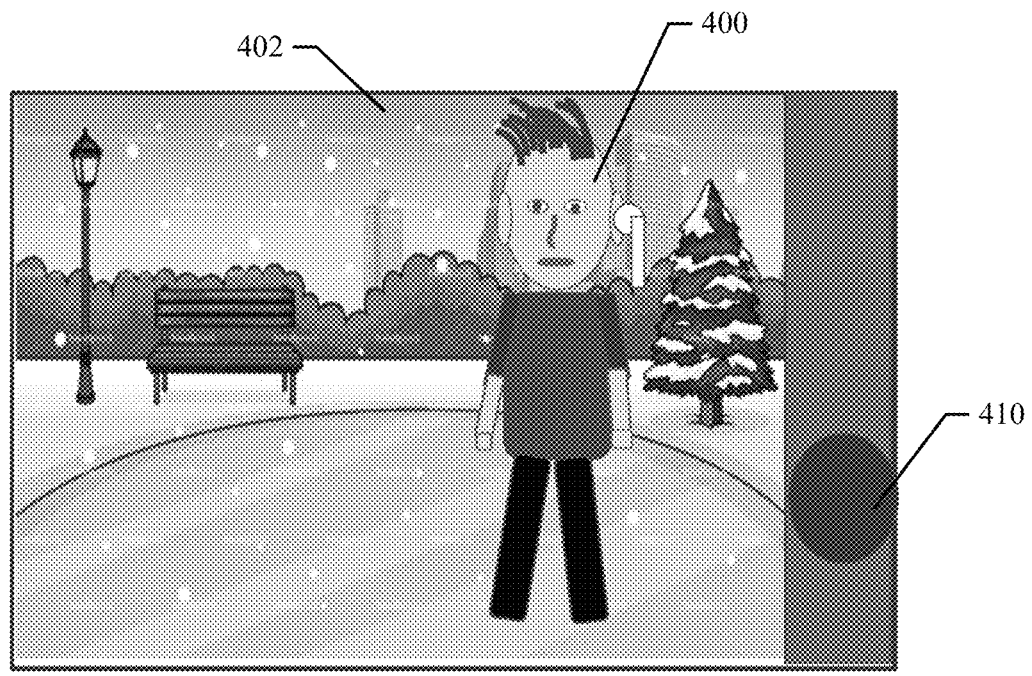
Figure 4B:
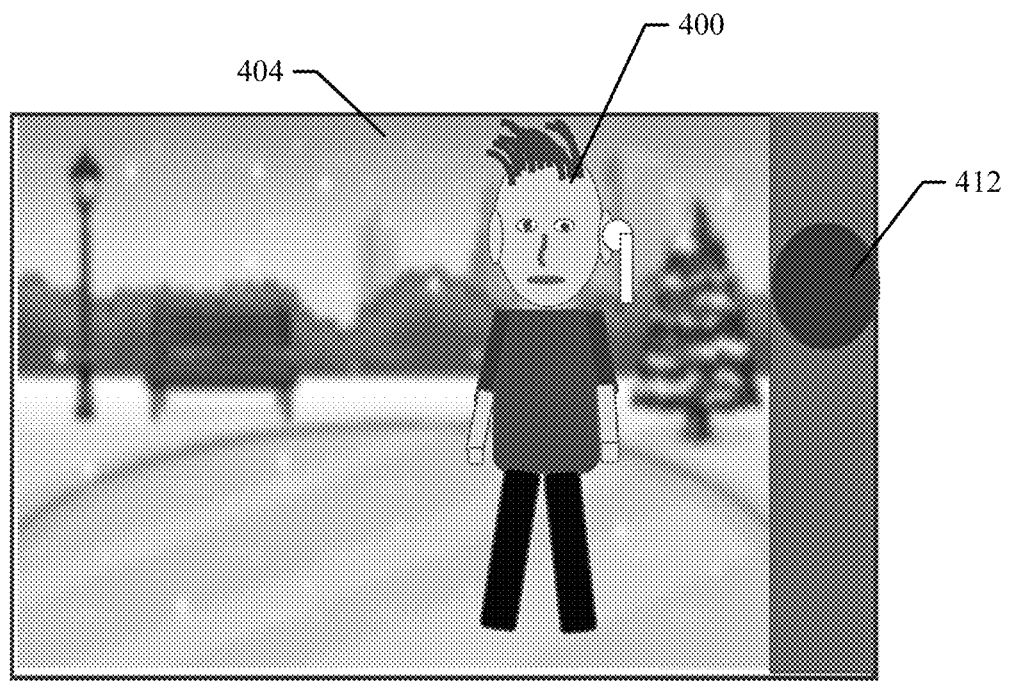
Figure 5:
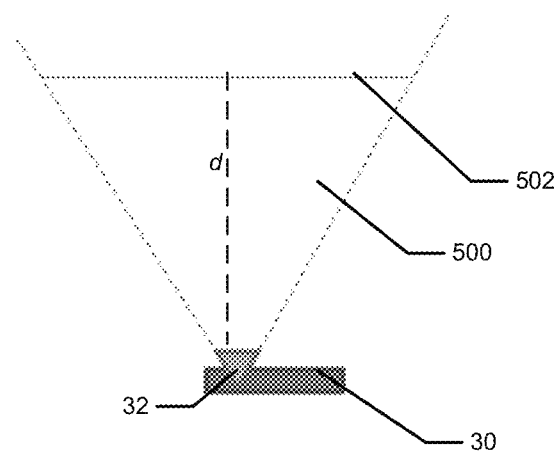
Figure 6:
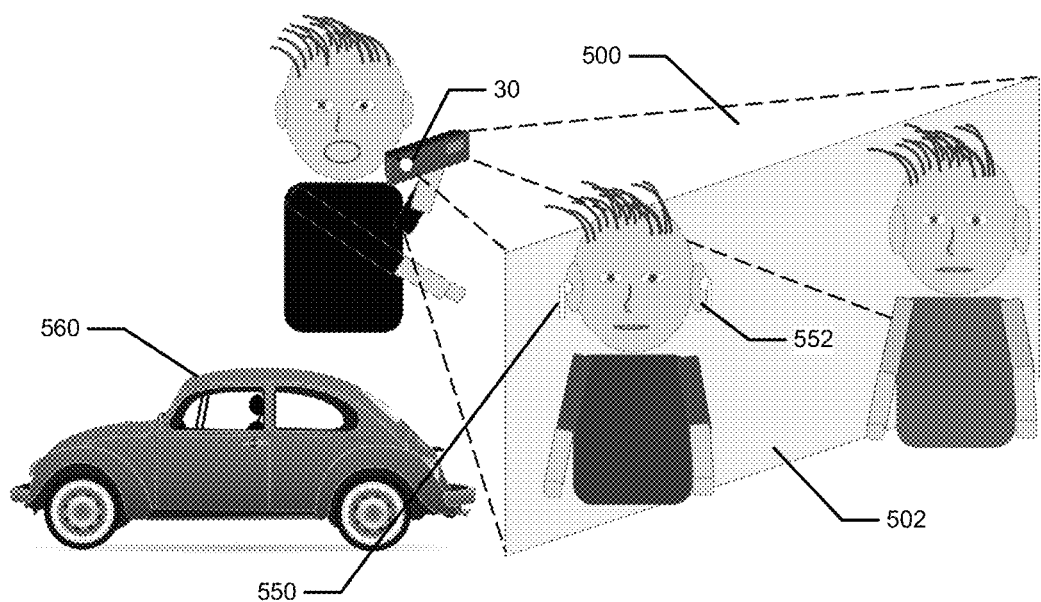
Figure 7:
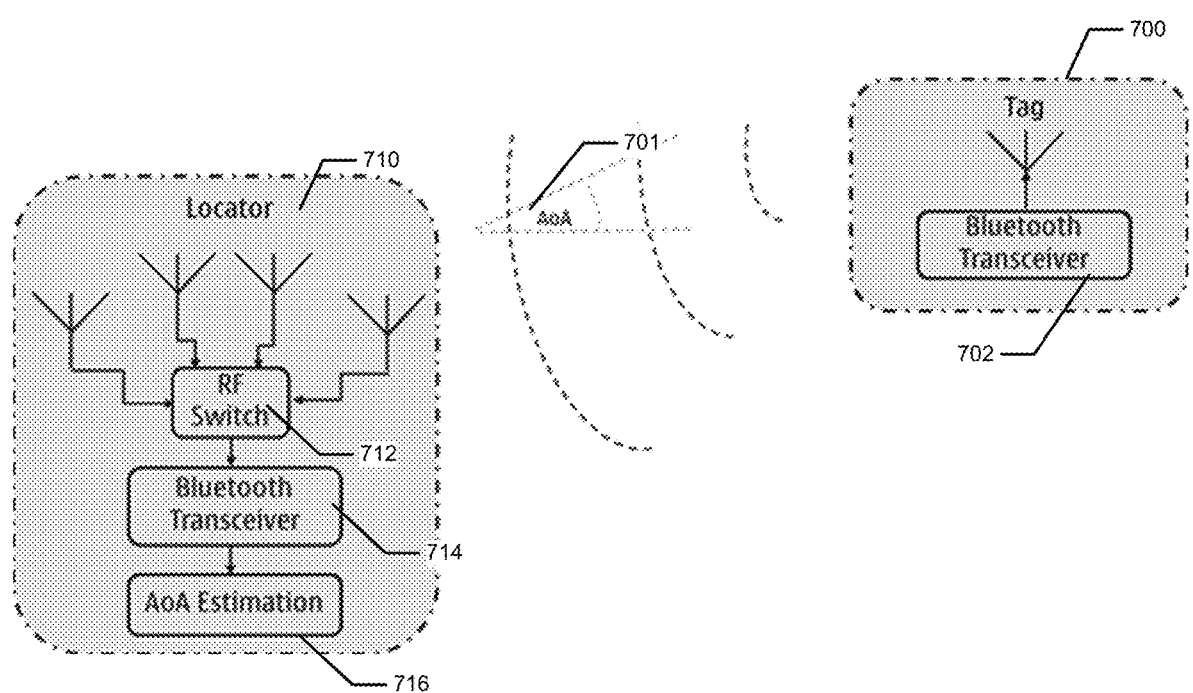

Having thus described certain example embodiments of the present disclosure in general terms, reference will hereinafter be made to the accompanying drawings which are not necessarily drawn to scale, and wherein:

FIG. 1 is an overview of a system that can be used to practice certain example embodiments described herein;

FIG. 2 is an exemplary schematic diagram of an apparatus in accordance with some example embodiments;

FIG. 3 is a flowchart of operations that may be performed in accordance with an example embodiment;

FIGS. 4A and 4B illustrate exemplary visual content in accordance with some example embodiments;

FIG. 5 is an exemplary schematic diagram of an environment in which visual content may be captured, in accordance with some example embodiments;

FIG. 6 is an exemplary schematic diagram of an environment in which visual content may be captured, in accordance with some example embodiments; and FIG. 7 is an exemplary schematic diagram in accordance with an example embodiment.

DETAILED DESCRIPTION

Some embodiments of the present disclosure will now be described more fully hereinafter with reference to the accompanying drawings, in which some, but not all, embodiments are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with certain embodiments of the present disclosure. Thus, use of any such terms should not be taken to limit the spirit and scope of certain embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

FIG. 1 is an overview of a system that can be used to practice certain example embodiments described herein, and should not be considered limiting. As illustrated in FIG. 1, an example embodiment is implemented as or employed in a distributed system. The various depicted components may be configured to communicate over a network 10, such as the Internet, for example, or any other communication interface as described in further detail hereinafter. In general, user device(s) 30 may be configured to communicate with a server 40 and/or microphones 50. User device 30 may include any computing device such as a smart phone, laptop, tablet, personal computer laptop and/or the like, and may be used to capture images, video content, audio signals, and/or the like. In certain example embodiments, user device 30 may therefore have an integrated camera and/or internal microphone.

The system of FIG. 1 may further include any number of microphones 50. As mentioned above, a microphone such as microphone 50 may be embedded in the user device 30. Additionally or alternatively, microphones 50 may be attached to or in direct communication with user device 30. And, in certain example embodiments, additional microphones 50 may be present in the system, but may be in communication with and/or under control by a different processor-driven computing device than that of user device 30. For example, some microphones 50 may be controlled by other or additional user devices or server. In any event, it will be appreciated that any number of microphones under the control of a variety of devices may be utilized according to certain example embodiments.

In some examples, the user device 30 and/or microphones 50 may be configured to communicate with server 40, which may be configured to receive captured or recorded content from user device 30, provide content to the user device 30, receive and process captured content, receive and process audio signals (such as received from user device 30 and/or microphones 50), and/or the like, to dynamically generate audio signals as described herein. In certain example embodiments, the aforementioned operations may be performed wholly or at least partially by user device 30, and the server 40 may be considered optional.

The system of FIG. 1 described above is provided merely as an example implementation and it will be appreciated that certain example embodiments provided herein may be implemented as or employed by any number of system architectures.

Referring now to FIG. 2, apparatus 200 is a computing device(s) configured for performing certain operations described herein according to certain example embodiments. Apparatus 200 may at least partially or wholly embody any of the user device 30, server 40, and/or microphones 50 described above.

Referring to FIG. 2, apparatus 200 may include or otherwise be in communication with processor 220, user interface 222, communication interface 224, and memory device 226. The user interface 222 may be considered optional in certain instances of apparatus 200, as indicated by the dashed line. For example, when apparatus 200 is embodied as server 40, user interface 222 may not be present.

In some examples, such as user device 30, apparatus 200 may include a wide variety of devices including personal computers, work stations, or mobile terminals, such as laptop computers, tablet computers, smartphones, wearable devices, or any combination of the aforementioned, and other types of voice and text communications systems. Additionally or alternatively, apparatus 200 may be embodied by a server, such as server 40, for processing captured content and audio signal captured by separated devices, generating the audio signal, and providing the captured content and/or generated audio signal for provision via a user interface of another device.

In some embodiments, the processor 220 (and/or co-processors or any other processing circuitry assisting or otherwise associated with the processor 220) may be in communication with the memory device 226 via a bus for passing information among components of the apparatus 200. The memory device 226 may include, for example, one or more volatile and/or non-volatile memories. In other words, for example, the memory device 226 may be an electronic storage device (e.g., a computer readable storage medium) comprising gates configured to store data (e.g., bits) that may be retrievable by a machine (e.g., a computing device like the processor 220). The memory device 226 may be configured to store information, data, content, applications, instructions, or the like for enabling the apparatus to carry out various functions in accordance with certain example embodiments. For example, the memory device 226 may store video content and/or consumption data relating to the video content. As another example, the memory device 226 could be configured to buffer input data for processing by the processor 220. Additionally or alternatively, the memory device 226 could be configured to store instructions for execution by the processor 220.

In some embodiments, the apparatus 200 may be embodied as a chip or chip set. In other words, the apparatus 200 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 200 may therefore, in some cases, be configured to implement an embodiment of the present disclosure on a single chip or as a single "system on a chip." As such, in some cases, a chip or chipset may constitute means for performing one or more operations for providing the functionalities described herein.

The processor 220 may be embodied in a number of different ways. For example, the processor 220 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 220 may include one or more processing cores configured to perform independently. A multi-core processor may enable multiprocessing within a single physical package. Additionally or alternatively, the processor 220 may include one or more processors configured in tandem via the bus to enable independent execution of instructions, pipelining and/or multithreading.

In certain example embodiments, the processor 220 may be configured to execute instructions stored in the memory device 226 or otherwise accessible to the processor 220. Alternatively or additionally, the processor 220 may be configured to execute hard coded functionality. As such, whether configured by hardware or software methods, or by a combination thereof, the processor 220 may represent an entity (e.g., physically embodied in circuitry) capable of performing operations according to an embodiment of the present disclosure while configured accordingly. Thus, for example, when the processor 220 is embodied as an ASIC, FPGA or the like, the processor 220 may be specifically configured hardware for conducting the operations described herein. Alternatively, as another example, when the processor 220 is embodied as an executor of software instructions, the instructions may specifically configure the processor 220 to perform the algorithms and/or operations described herein when the instructions are executed. However, in some cases, the processor 220 may be a processor of a specific device (e.g., a mobile terminal or network entity) configured to employ an embodiment of the present disclosure by further configuration of the processor 220 by instructions for performing the algorithms and/or operations described herein. The processor 220 may include, among other things, a clock, an arithmetic logic unit (ALU) and logic gates configured to support operation of the processor 220.

Meanwhile, the communication interface 224 may be any means such as a device or circuitry embodied in either hardware or a combination of hardware and software that is configured to receive and/or transmit data from/to a network and/or any other device or module in communication with the apparatus 200. In this regard, the communication interface 224 may include, for example, an antenna (or multiple antennas) and supporting hardware and/or software for enabling communications with a wireless communication network. Additionally or alternatively, the communication interface 224 may include the circuitry for interacting with the antenna(s) to cause transmission of signals via the antenna(s) or to handle receipt of signals received via the antenna(s). In some environments, the communication interface 224 may alternatively or also support wired communication. As such, for example, the communication interface 224 may include a communication modem and/or other hardware/software for supporting communication via cable, digital subscriber line (DSL), universal serial bus (USB) or other mechanisms. Communication interface 224 may include a network (e.g., network 10), such as any wired or wireless communication network including a local area network (LAN), personal area network (PAN), wide area network (WAN), the Internet, an intranet, or the like, as well as any attendant hardware, software and/or firmware required to implement said networks (e.g. network routers and network switches). The communication interface 224 may be configured to facilitate communication between apparatus 200 and other devices. For example, communication interface 224 may enable communication between user device 30, server 40, and/or microphones 50.

In some embodiments, such as when apparatus 200 is embodied as user device 30, a user interface 222 may be present. The user interface 222 may be configured to cause provision of any audible, visual, mechanical or other output to the user. As such, the user interface 222 may include a display, such as one configured for displaying an image or video. Example displays which may be included in user interface 222 may include a computer monitor, tablet screen, television monitor, head-worn display, other wearable display, a display or plurality of displays providing a virtual reality environment, and/or the like. In some examples, user interface 222 may include additional output mechanisms.

The user interface 222 may include a means for user input, such as a keyboard, mouse, joystick, touch screen, touch areas, scroller ball, soft keys, a microphone (e.g., microphone 50), ringer, speaker, or other input mechanisms. In some embodiments, the user interface 222 may include a camera for capturing images and/or video content which may be processed and/or provided by certain example embodiments.

In some examples, the processor 220 may comprise user interface circuitry configured to control at least some functions of one or more of the aforementioned user interface elements. The processor 220 and/or user interface circuitry comprising the processor 220 may be configured to control one or more functions of one or more user interface elements through computer program instructions (e.g., software and/or firmware) stored on a memory accessible to the processor 220 (e.g., memory device 226, and/or the like). In some examples, user interface 222 may be embodied by a user device that is remote from or external to apparatus 200.

FIG. 3 is a flowchart of operations performed by apparatus 200 according to certain example embodiments. As shown by operation 300, apparatus 200 may include means, such as the processor 220, user interface 222, communication interface 224, memory device 226, or the like, for receiving an indication of visual content and a visual focal plane associated therewith. The visual content may be an image and/or video captured by a user device 30 and communicated to server 40, for example. Examples of visual content as displayed in a view finder or display of user device 30, for example, are provided in FIGS. 4A and 4B. In FIGS. 4A and 4B, the subject 400 is in focus, and the visual content further includes environments 402 (in FIG. 4A) and 404 (in FIG. 4B) in which the subject 400 stands. In FIGS. 4A and 4B, the position in which the subject 400 stands may be determined, such as by the processor 220 of certain example embodiments, to be on the visual focal plane. FIG. 5 further illustrates the user device 30, comprising a camera 32 for capturing the visual content. The field of view 500 covers the area in the scene or environment captured in the visual content, and the visual focal plane 502 may be determined, such as by processor 220 of an example embodiment, a plane that is orthogonal to an optical axis of a camera from which the visual content is captured, that lies at a distance d from the camera where the lens is focused. As indicated by the dashed lines extending from the camera 32, the field of view 500 can extend behind the visual focal plane 502.

FIG. 6 is an exemplary depiction of a scene in which visual content may be captured according to certain example embodiments. According to the example, user device 30 may be held by a user to capture content of two individuals. The field of view 500 is a three-dimensional space outlined by the dashed lines. The visual focal plane 502 is a two-dimensional plane in which at least one of the individuals, or portion thereof is located, and is in the same position as the focus of the camera 32 when the visual content is captured, such as determined by processor 220.

Accordingly, the visual content and visual focal plane indicated in operation 300 may be provided by data associated with the camera 32 and/or user device 30, such as determined by processor 220. For example, data relating to how the user focuses the camera while capturing the visual content may be used to determine the position of the visual focal plane 502 in the visual content. For example, data relating to the focus and/or zooming of the camera may be correlated to estimate or determine the distance d of the visual focal plane 502 from the camera 32 and/or user device 30 at the point in time the visual content is captured, such as with processor 220.

According to certain example embodiments, such as when the camera data is not available, apparatus 200, such as with processor 220, may estimate the visual focal plane 502 by processing and analyzing the visual content. For example, certain algorithms for pixel analysis, bokeh analysis, and/the like may be contemplated for estimating the visual focal plane 502.

In operation 302 of FIG. 3, apparatus 200 may include means, such as the processor 220, user interface 222, communication interface 224, memory device 226, or the like, for receiving indications of at least two microphones and their respective positions relative to the visual focal plane. The at least two microphones may be configured in a variety of ways.

In certain example embodiments, at least a first microphone of the at least two microphones may be embedded in the user device 30 (e.g., an internal microphone of the user device 30) from which the visual content is captured, and/or may be positioned within a first threshold distance of the user device 30 from which the visual content is captured, when the visual content is captured, such as determined by processor 220.

The processor 220 of certain example embodiments may detect based on device data, whether a microphone from which an audio signal is received is embedded in the same user device 30 from which visual content is captured. However, certain example embodiments may use locations of microphones and a first threshold distance that is configured as a predefined distance, such as 3 feet, for example. For the sake of brevity, the at least first microphone that is embedded in the user device 30, or is positioned within a first threshold distance of the device when the visual content is captured, may be referenced herein as a "local microphone" to emphasize the microphone is within close proximity of the user device 30 when the visual content is captured, and not a microphone further away from the user device 30, as the at least second microphone, described in further detail below. It will be further appreciated that any number of "local microphones" may be present. For example, a user of the user device 30 may be wearing a left and right earphone, each with respective embedded microphones. The user device 30 may further have an embedded local microphone or multiple embedded local microphones, or a user may be wearing other wearable microphones associated with the user device 30.

In certain example embodiments, such as those in which the first, or "local microphone" is positioned within a first threshold distance of the user device 30, the at least second microphone is positioned within a second threshold distance of the visual focal plane when the visual content is captured. For example, in FIG. 6, an individual in the scene of the captured visual content may be wearing headphones with embedded microphones, or remote microphones 550 and 552, such as determined by processor 220. The individual may be the focus of the visual content such that the remote microphone 550 and/or 552 may be close to, or aligned with the visual focal plane 502. For example, a second threshold distance may be predefined or preconfigured, or may be dynamically determined based on the distance d of the visual focal plane 502 from the user device 30. For example, processor 220 may determine the second threshold distance to be an area within 15% of the distance d from the visual focal plane 502. In certain example embodiments, a second threshold distance may further comprise or be dependent on a distance relative to borders of the visual focal plane 502 (e.g., where the visual focal plane intersects the boundaries of the field of view 500), and/or a position on the visual focal plane 502 (e.g., an x-y coordinate(s) such as an object of focus in the visual focal plane 502). For the sake of brevity, the at least second microphone positioned within a second threshold distance of the visual focal plane 502, within a second threshold distance of a border of the visual focal plane 502, and/or within a second threshold distance of a position on the visual focal plane 502, may be referenced herein as a "remote microphone" to distinguish that the microphone is further from the user device 30 that captures the visual content, than the "local microphone," which is embedded in the user device 30 that captures the visual content, or in close proximity to the user device 30 that captures the visual content.

The positions of microphones may be determined in a variety of ways, such as at least with processor 220. It will be appreciated that the below provided methods are provided merely as examples, and any other methods for determining positions of microphones may be contemplated. The processor 220 of certain example embodiments may utilize any of the below methods for determining a position of a remote microphone. In certain example embodiments, other methods may be utilized for determining a position of a local microphone within the first threshold distance of the user device 30 that captures visual content. However, in certain example embodiments, processor 220 utilizes device data from the user device 30 to determine the position of the local microphone.

In any event, in certain example embodiments, processor 220 utilizes a compass and/or GPS (Global Positioning System) in the user device 30 and/or other computing device comprising a remote microphone 550 and/or 552, to determine a position of the remote microphone with respect to the visual focal plane 502.

According to certain example embodiments, processor 220 may utilize audio signals captured by the microphones to estimate or determine microphone positions. For example, "Passive Self-Localization of Microphones Using Ambient Sounds," EUSIPCO, Bucharest, Romania, August 27-31, 2012 (Pertila, P.; Mieskolainen, M.; Hämäläinen M.,) describes a method for finding distances between microphone pairs by processing a cross-correlation behavior of the microphone pair signals, and based on pairwise distances, calculates the relative locations of the microphones. The processor 220 of an example embodiment may utilize the same or similar methods to estimate microphone positions.

Additionally or alternatively, the processor 220 of certain example embodiments use a device camera 32 to detect a remote microphone location in the visual content, if the microphone is visible to the device camera. The processor 220 of certain example embodiments detect the microphone in such an area of the visual content and/or other camera image where a depth map indicates that the area is in or near the visual focal plane.

In certain example embodiments, processor 220 may determine positions of microphones using near field communication, such as Bluetooth® communication. For example, some headphones, such as earbuds or Earpods™ may have near field communication capabilities. In certain example embodiments, processor 220 may utilize techniques such as but not limited to three-dimensional indoor positioning, such as Bluetooth® Low Energy (BLE). A processor 220 of an example embodiment may utilize an array of phased antennas of a device to measure the angle-of-departure or angle-of-arrival, such as azimuth and/or elevation angles. The processor 220 of an example embodiment may therefore utilize a BLE solution for mobile centric positioning based on broadcasting angle-of-departure signals, and location and properties of the beacon. This may enable an unlimited number of tracking devices to calculate their own position and provide the position data to apparatus 200, and/or enable the processor 220 of apparatus 200 to calculate respective positions of microphones, according to certain example embodiments.

A schematic diagram of angle-of-arrival estimation is depicted in FIG. 7, according to certain example embodiments. According to certain example embodiments, a communication interface 224 of a tag device 700 (e.g. in a remote microphone 550 and/or 552) transmits angle-of-arrival packets 701 via a Bluetooth® transceiver 702. A locator device 710, such as user device 30, for example, may execute antenna switching via a radio frequency switch 712 (such as may be provided in a Bluetooth® transceiver 714), during the reception of the packet. The locator device 710 may scan for the angle-of-arrival packets and execute amplitude and phase sampling during reception of these packets. The locator device 710 may then utilize the amplitude and phase samples, along with its own antenna array information, to estimate the angle-of-arrival 716 of the packet from the tag device 700.

In certain example embodiments, Bluetooth® communication may not provide a precise position of the tag distance, and the processor 220 of certain example embodiments may alternatively or additionally estimate a position from the signal strength. In some embodiments, the processor 220 of certain example embodiments may utilize the camera depth map information in the direction of the tag to determine the distance of the tag from the user device 30, and therefore the distance and/or position of a remote microphone.

It will be appreciated that any methods may be used in determining a position of a microphone, and therefore, the processor 220 of certain example embodiments may receive indications of, or determine positions of microphones relative to the visual focal place.

In operation 304 of FIG. 3, apparatus 200 may include means, such as the processor 220, communication interface 224, memory device 226, or the like, for generating an audio signal dependent on at least respective positions of first and second microphones relative to the visual focal plane. Accordingly, generating the audio signal may comprise mixing, with processor 220, audio signals received from either or both of first and second microphones (or any number of available microphones). In this regard, mixing audio signals to dynamically generate an audio signal may comprise amplifying, attenuating and/or omitting audio signals from certain microphones, and/or amplifying, attenuating and/or omitting audio signals from other microphones.

Processor 220 may dynamically generate an audio signal by variably amplifying and/or attenuating certain audio signals (e.g., applying different weighting to amplification and/or attenuation, and or varying the decibels of certain audio signals), dependent on various factors described herein. For example, an audio signal from a first microphone may be amplified 150%, while a second audio signal from a second microphone may be amplified 110%, and a third audio signal may be attenuated to 15%. The above is provided merely as an example and it will be appreciated that any number of microphones may be present and may be amplified and/or attenuated in variable amounts, decibels, levels, or percentages. Still further, it should be appreciated that any reference herein to amplification, attenuation, focusing an audio signal, and/or applying an audio signal more or less, may further include such modifications being performed variably (with different amounts, decibels, percentages, and/or the like). Similarly, it will be appreciated that when reference is made to amplifying a certain audio signal, a similar effect may be achieved by attenuating a different audio signal. Many variations of dynamical audio signal generation may be contemplated.

The processor 220 of certain example embodiments may dynamically generate the audio signal dependent on a level of bokeh in the visual content, as may be determined by processor 220. In this regard, the audio effects may be described as an "audio bokeh effect." For example, using camera data, some embodiments may determine that a relatively lower level of bokeh, as indicated by indicator 410 in FIG. 4A, may be applied, relative to another higher level of bokeh, as indicated by indicator 412 in FIG. 4B. Based on the user control of the bokeh level applied while capturing the visual content, the environment 402 (e.g., the background) in FIG. 4A appears less blurry than the environment 404 of FIG. 4B, in which a higher bokeh level is applied by the user than during the capture of visual content in FIG. 4A. In this regard, camera data from the user device 30 may indicate the level of bokeh. Accordingly, the processor 220 of certain example embodiments may dynamically generate audio signals, dependent on the level of bokeh. For example, according to the example of FIG. 4A, since a relatively lower bokeh level may be applied in comparison to the example of FIG. 4B, equal levels of audio signal from a local microphone and/or remote microphone may be used to generate the audio signal. In contrast, according to the example of FIG. 4B, which reflects a higher bokeh level, certain example embodiments may utilize audio signal from the remote microphone (e.g., an earbud of the subject 400), which is closer to the visual focal plane in comparison to a local microphone.

According to certain example embodiments, the stronger the visual bokeh effect that is applied in the visual content, such as by the user of user device 30, the more the remote microphone signal is used in generating the audio signal by processor 220, compared to an audio signal of a local microphone, such an internal microphone of user device 30. References herein to "more" or "less" audio signal being used may refer to amplification of one audio signal, and lesser or no amplification of another audio signal by processor 220. In this regard, with reference to FIG. 6, a generated audio signal may reflect sound sources near the visual focal plane (e.g., the 2 individuals captured in the field of view 500, and the car 560, even though positioned outside the field of view 500) may be heard louder during playback of the generated audio signal, or more clearly than, sound sources further away from the visual focal plane (e.g., sound sources closer to the user device 30, such as the user of the user device 30).

A variety of methods may be used to generate an audio signal and/or create an audio bokeh effect according to certain example embodiments. The process of an example embodiment may mix microphone signals using processor 220 to create a mono (e.g., using only one microphone), stereo, spatial, binaural, and/or focused (e.g., beamformed) signal. In certain example embodiments, two or more signals may be mixed together depending on various factors such as the user setting of bokeh for the camera image and the remote microphone location. In certain example embodiments, if there is no visual bokeh effect, then a remote microphone signal may not be used. In certain example embodiments, if the visual bokeh effect is at a maximum (such as an aperture setting of f/0.95, for example), or equal to or greater than a threshold level, the audio signal may be generated utilizing a remote microphone(s) only.

In certain example embodiments, if there are more than one remote microphones, the apparatus, such as processor 220, may be configured determine to use only those microphones that are on or near the visual focal plane (e.g., within a third threshold distance of the visual focal plane) to create an audio bokeh effect.

Whereas creating an audio bokeh effect with processor 220 may involve mixing audio signals from local microphones and remote microphones, in certain example embodiments, no local microphones may be present. However, if there are at least two remote microphones 550 and 552, the audio signal may be dynamically generated according to their respective positions relative to the visual focal plane. The processor 220 of certain example embodiments may use the remote microphones to utilize a higher level of audio signal from sound sources that are near the visual focal plane than from sound sources that are further away from the visual focal plane (so that sounds occurring closer the visual focal plane are perceived as louder, or clearer, to a listener of the generated audio signal). In certain examples, a processor 220 of an example embodiment may focus the audio signal created from the microphones in the directions of the focal plane and not in the directions orthogonal to the visual focal plane. In this regard, focusing an audio signal as used herein may refer to amplifying sound sources (such as those on or near the visual focal plane), in comparison to other sound sources, and/or attenuating other audio signals (such as those further from the visual focal plane). The processor 220 of an example embodiment may also limit or reduce the variations in audial focusing or amplification so that an example embodiment amplifies sound sources outside the visual focal plane borders (e.g., sound sources that are not visible in the visual content).

A processor 220 of an example embodiment may further dynamically generate an audio signal to provide perception of various sound sources in different positions. For example, an embodiment may dynamically generate an audio signal such that sounds near a left side of the visual focal plane are provided in a way that playback of the audio signal provides perception to the user of the sound source originating on the left side of the visual content.

According to certain example embodiments, if the apparatus, such as processor 220, detects two remote microphones 550 and 552 in or near the visual focal plane the device may use the leftmost of the microphones to create a left channel and rightmost of the microphones to create a right channel and may therefore provide a stereo audio signal. For example, a leftmost remote microphone 550 may be in the right ear of an earbud of a person that is near the visual focal plane and whose portrait is captured in the visual content. A rightmost remote microphone 552 may be in the left ear of the same person. Accordingly, the processor 220 of an example embodiment may determine the closer microphone to the visual focal plane and utilize only the closer microphone, and/or amplify the sound signal from the closer microphone more so than the sound signal from the microphone that is further from the visual focal plane.

In certain example embodiments, if a leftmost remote microphone is near the visual focal plane border, the processor 220 may use mostly or only another remote microphone in or near the visual focal plane so that sound sources just outside the left border are not amplified. For example, with reference to FIG. 6, the processor 220 of an example embodiment may utilize an audio signal from remote microphone 552 more than the audio signal from remote microphone 550 because remote microphone 550 is closer to the visual focal plane border and thus more likely to capture sounds from sound sources outside the field of view 500 such as the car. Similar variations may be made for any other border of the visual focal plane, and/or dependent on the proximity of one microphone to the visual focal plane relative to another (e.g., left or right microphones), according to an example embodiment.

It will be appreciated that processor 220 of certain example embodiments may combine various methods, conditions, and/or processing described herein to determine how to mix (e.g., amplify, attenuate, and/or omit) audio signals. For example, in an example embodiment, the stronger the visual bokeh that is applied via user device 30, the more remote microphone 552 the processor 220 uses, compared to remote microphone 550, when generating the audio signal. Similar variations may be made for any other border of the visual focal plane, according to an example embodiment.

The processor 220 of certain example embodiments may use beamforming or other audio focus methods to generate audio signals having an effect of focus, or a stronger signal, from sound sources positioned closer to the center of the visual focal plane, in comparison to other positions. Beamforming may be used to create an effect of a sound originating from a particular location. Processor 220 of an example embodiment may identify the center based on the point where the camera optical axis intersects the visual focal plane as determined by the processor 220. In this regard, sound sources outside the field of view 500 may not be unnecessarily amplified. Other variations may be implemented. For example, in some example embodiments the beams may not necessarily be directly towards the center, but may be directed away from the focal view plane borders.

In certain example embodiments, processor 220 may utilize remote microphone arrays to generate the audio signal. With reference to FIG. 6, remote microphones 550 and 552 may be implemented as microphone arrays. The processor 220 of an example embodiment may leverage microphone arrays to beam generated audio signals away from visual focal plane borders. It will be appreciated that certain elements or embodiments may be combined for determining how to mix (e.g., amplify, attenuate, and/or omit) audio signals from different microphones. For example, the stronger the bokeh effect indicated by the user device 30, the more narrow the beams are and/or the more towards the plane center they may be directed. Additionally or alternatively, the closer the remote microphones are to the visual focal plane, the more signal from those microphone may be used by processor 220 in mixing the audio signals and/or dynamically generating the audio signal.

Processor 220 of certain example embodiments may use a depth map to enable processor 220 to determine positions of objects in or near the visual focal plane and use only or mostly the microphones that are near such objects. For example, a detected object may be detected as a sound source. Processor 220 of an example embodiment may amplify, or may amplify more, audio signals from microphones closer to a detected object that is near (e.g., within a threshold distance of), or on the visual focal plane, in comparison to audio signals from microphones further from a detected object.

It will be appreciated that the above descriptions are provided merely as examples, and any algorithm and/or mixing of audio signals from different microphones may be determined by processor 220, based on the respective positions of associated microphones relative to the visual focal plane.

Returning to FIG. 3, in operation 306, apparatus 200 may include means, such as the processor 220, user interface 222, communication interface 224, memory device 226, or the like, for causing provision of the generated audio signal via a user interface, such as for example, a speaker or speaker(s) of a user device, such as a user device 30. In this regard, a communication interface 224 and/or user interface 222 as directed by processor 220 of an example embodiment may provide the visual content and/or corresponding generated audio signal for playback. A user consuming the visual content and/or audio signal may experience improved effects, because the dynamically generated audio signal provides a greater emphasis on the more important sounds from the visual focal areas of the image or video, and less emphasis on the less important sounds from areas further than the visual focal plane, as determined by processor 220 of an example embodiment. Accordingly, a user may experience heightened enjoyment, or a more immersive viewing and/or listening experience. In some examples, the extent of perception of audio effects described herein created based on the dynamically generated audio signal may further vary based on a speaker configuration and/or number of speakers of a listening device and/or speaker array.

It will be appreciated that for brevity, certain example embodiments provided herein are described with reference to focus of visual content within an image, and corresponding positions of microphones when the visual content is captured. However, processor 220 of certain example embodiment may be apply similar methods or processing to video content in which the visual focal plane may move over time, and/or the positions of microphones may move as the content is captured. In this regard, the same or similar concepts disclosed herein may be applied to video content such that the generated audio signal and/or audio bokeh effect "moves" or changes to accompany corresponding frames of the video content, as determined by processor 220. For example, in one subset of frames, the processor of certain example embodiments may apply an audio bokeh effect differently than in another subset of frames, dependent on a position of a visual focal plane, positions of microphone relative to the visual focal plane, and/or a level of visual bokeh applied to the corresponding visual content, which may also change from frame to frame, according to certain example embodiments. Many variations and/or modifications may be contemplated.

As described above, FIG. 3 illustrates a flowchart of an apparatus 200, method, and computer program product according to an example embodiment. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 226 of an apparatus 200 employing an embodiment of the present disclosure and executed by a processor 220 of the apparatus 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe certain example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising: at least one processor and at least one memory including computer program code, the at least one memory and the computer program code configured to, with the processor, cause the apparatus to at least:
receive data indicative of visual content and a visual focal plane associated therewith;
receive data indicative of at least two microphones and their respective positions relative to the visual focal plane, wherein at least a first microphone is positioned such that at least one of the following conditions is satisfied when the visual content is captured: (a) the first microphone is embedded in a device from which the visual content is captured, or (b) the first microphone is within a first threshold distance of the device from which the visual content is captured, and wherein at least a second microphone is positioned within a second threshold distance of the visual focal plane when the visual content is captured; and
generate an audio signal dependent on at least respective positions of first and second microphones of the at least two microphones relative to the visual focal plane.

2. The apparatus according to claim 1, wherein the visual focal plane is (a) orthogonal to an optical axis of a camera from which the visual content was captured, and (b) at a distance from the camera where the lens is focused.

3. The apparatus according to claim 1, wherein the audio signal is generated further dependent on a level of bokeh in the visual content.

4. The apparatus according to claim 1, wherein the audio signal is generated further dependent on respective positions of the first and second microphones relative to borders of the visual focal plane.

5. The apparatus according to claim 1, wherein at least the first microphone is positioned within a threshold distance of the visual focal plane when the visual content is captured.

6. The apparatus according to claim 1, wherein the audio signal is generated further dependent on respective positions of the first and second microphones relative to a position on the visual focal plane.

7. The apparatus according to claim 6, wherein the position on the visual focal plane is the center of the visual focal plane.

8. The apparatus according to claim 1, wherein the audio signal is generated further dependent on a position of a detected object.

9. A method comprising:
receiving data indicative of visual content and a visual focal plane associated therewith;
receiving data indicative of at least two microphones and their respective positions relative to the visual focal plane, wherein at least a first microphone is positioned such that at least one of the following conditions is satisfied when the visual content is captured: (a) the first microphone is embedded in a device from which the visual content is captured, or (b) the first microphone is within a first threshold distance of the device from which the visual content is captured, and wherein at least a second microphone is positioned within a second threshold distance of the visual focal plane when the visual content is captured; and
generating an audio signal dependent on at least respective positions of first and second microphones of the at least two microphones relative to the visual focal plane.

10. The method according to claim 9, wherein the visual focal plane is (a) orthogonal to an optical axis of a camera from which the visual content was captured, and (b) at a distance from the camera where the lens is focused.

11. The method according to claim 9, wherein the audio signal is generated further dependent on a level of bokeh in the visual content.

12. The method according to claim 9, wherein the audio signal is generated further dependent on respective positions of the first and second microphones relative to borders of the visual focal plane.

13. The method according to claim 9, wherein at least the first microphone is positioned within a threshold distance of the visual focal plane when the visual content is captured.

14. The method according to claim 9, wherein the audio signal is generated further dependent on respective positions of the first and second microphones relative to a position on the visual focal plane.

15. The method according to claim 14, wherein the position on the visual focal plane is the center of the visual focal plane.

16. The method according to claim 9, wherein the audio signal is generated further dependent on a position of a detected object.

17. A computer program product comprising: at least one non-transitory computer-readable storage medium having computer-executable program code instructions stored therein, the computer-executable program code instructions comprising program code instructions to:
receive data indicative of visual content and a visual focal plane associated therewith;
receive data indicative of at least two microphones and their respective positions relative to the visual focal plane, wherein at least a first microphone is positioned such that at least one of the following conditions is satisfied when the visual content is captured: (a) the first microphone is embedded in a device from which the visual content is captured, or (b) the first microphone is within a first threshold distance of the device from which the visual content is captured, and wherein at least a second microphone is positioned within a second threshold distance of the visual focal plane when the visual content is captured; and
generate an audio signal dependent on at least respective positions of first and second microphones of the at least two microphones relative to the visual focal plane.

18. The computer program product of claim 17, wherein the visual focal plane is (a) orthogonal to an optical axis of a camera from which the visual content was captured, and (b) at a distance from the camera where the lens is focused.

* * * * *